United States Patent
Johnston et al.

(10) Patent No.: US 11,740,152 B2
(45) Date of Patent: Aug. 29, 2023

(54) METHOD AND SYSTEM FOR DETECTING AND DIAGNOSING FLUID LINE LEAKAGE FOR INDUSTRIAL SYSTEMS

(71) Applicant: WATLOW ELECTRIC MANUFACTURING COMPANY, St. Louis, MO (US)

(72) Inventors: Robert E. Johnston, St. Louis, MO (US); Daniel Gander, St. Louis, MO (US); Chelsea Hogard, St. Louis, MO (US); Miranda Pizzella, St. Louis, MO (US); Andrew D. Selvy, St. Louis, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 29 days.

(21) Appl. No.: 17/578,975

(22) Filed: Jan. 19, 2022

(65) Prior Publication Data
US 2022/0228942 A1    Jul. 21, 2022

Related U.S. Application Data

(60) Provisional application No. 63/138,883, filed on Jan. 19, 2021.

(51) Int. Cl.
*G01M 3/18* (2006.01)
*G01M 3/00* (2006.01)
*G01M 3/28* (2006.01)

(52) U.S. Cl.
CPC .............. *G01M 3/002* (2013.01); *G01M 3/18* (2013.01); *G01M 3/2815* (2013.01)

(58) Field of Classification Search
CPC .......... G01M 3/00; G01M 3/002; G01M 3/18; G01M 3/40; G01M 3/2815
See application file for complete search history.

(56) References Cited

U.S. PATENT DOCUMENTS

| | | | |
|---|---|---|---|
| 5,067,094 A | 11/1991 | Hayes | |
| 7,308,824 B2 | 12/2007 | Trescott, Jr. et al. | |

(Continued)

FOREIGN PATENT DOCUMENTS

| | | | |
|---|---|---|---|
| JP | 6800074 B2 | 12/2020 | |
| TW | 201947183 A | 12/2019 | |

(Continued)

OTHER PUBLICATIONS

Search Report issued in corresponding TW Application No. 111102253, dated Jan. 7, 2023, 1 page.

(Continued)

*Primary Examiner* — Nguyen Q. Ha
(74) *Attorney, Agent, or Firm* — Burris Law, PLLC

(57) ABSTRACT

A method of detecting a leak-induced abnormal condition in a fluid line system having a plurality of heaters includes determining a plurality of temperature characteristics at a plurality of locations of the fluid line system, where each temperature from among the plurality of temperature characteristics is associated with at least one heater from among the plurality of heaters and monitoring, for each of the plurality of heaters, an electrical characteristic of the heater. The method includes determining the leak-induced abnormal condition is present within the fluid line system in response to the electrical characteristic of a given heater from among the plurality of heaters and the temperature characteristic associated with the given heater satisfying a temperature-and-electrical characteristics (TEC) deviation condition and performing a corrective action in response to determining the leak-induced abnormal condition is present.

24 Claims, 5 Drawing Sheets

(56) References Cited

U.S. PATENT DOCUMENTS

| | | | |
|---|---|---|---|
| 7,334,455 B2* | 2/2008 | Yanagi | G01M 3/3254 |
| | | | 73/49.2 |
| 9,400,227 B2 | 7/2016 | Ramos et al. | |
| 9,888,526 B2 | 2/2018 | Faulkner et al. | |
| 10,352,745 B2 | 7/2019 | Easey et al. | |
| 2015/0355120 A1 | 12/2015 | Deutsher et al. | |
| 2016/0370809 A1* | 12/2016 | Miller | G01M 3/002 |
| 2020/0032494 A1 | 1/2020 | Trescott et al. | |
| 2021/0022212 A1 | 1/2021 | Cimino et al. | |
| 2021/0207830 A1 | 7/2021 | Chen | |

FOREIGN PATENT DOCUMENTS

| | | | |
|---|---|---|---|
| WO | 2008102104 A1 | 8/2008 |
| WO | 2019226462 A1 | 11/2019 |
| WO | 2020229810 A1 | 11/2020 |

OTHER PUBLICATIONS

International Search Report issued in corresponding International Application No. PCT/US2022/012924, dated Apr. 8, 2022, 13 pages.

* cited by examiner

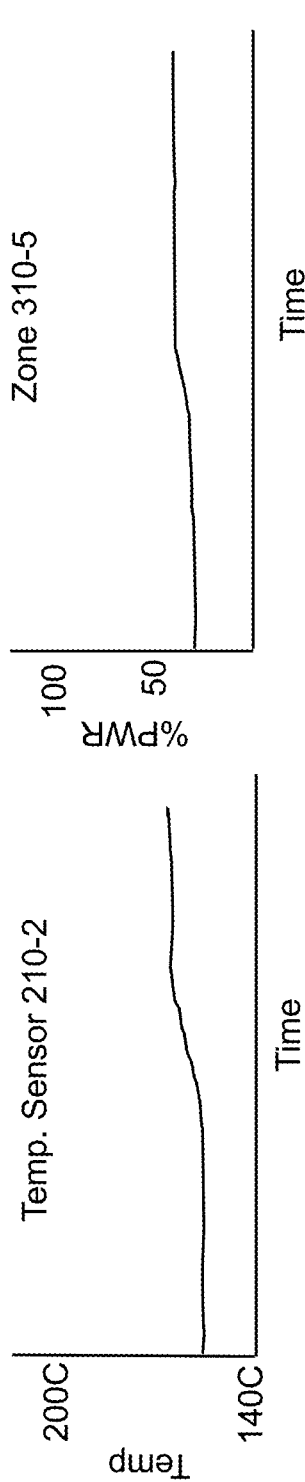
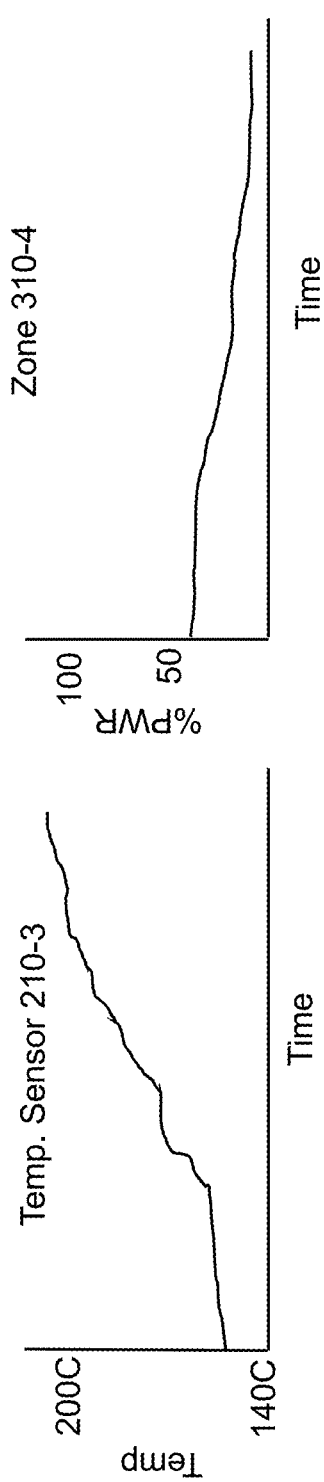
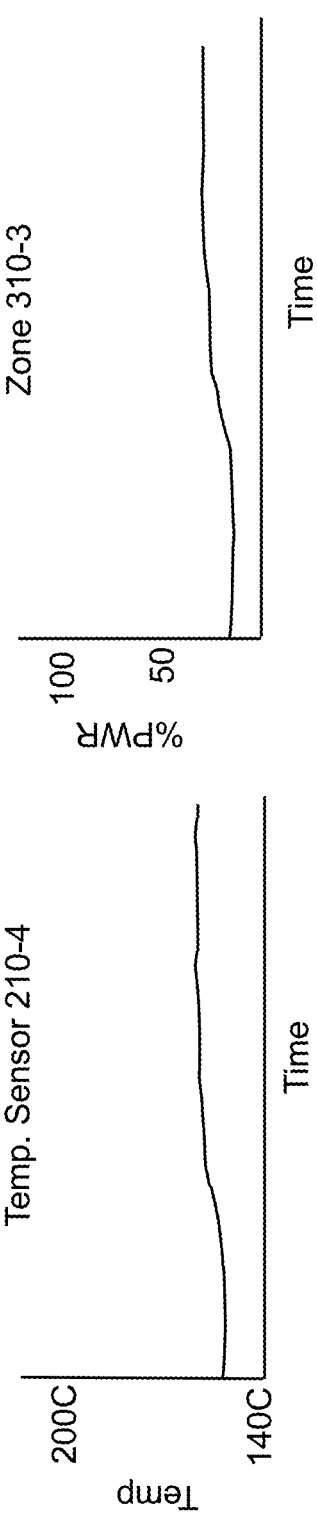
FIG. 4A
FIG. 4B
FIG. 4C

METHOD AND SYSTEM FOR DETECTING AND DIAGNOSING FLUID LINE LEAKAGE FOR INDUSTRIAL SYSTEMS

CROSS-REFERENCE TO RELATED APPLICATION

This application claims priority to U.S. provisional application No. 63/138,883 filed on Jan. 19, 2021. The disclosure of the above application is incorporated herein by reference.

FIELD

The present disclosure relates to systems and methods for detecting and diagnosing abnormal conditions in industrial fluid flow systems, such as by way of example, a semiconductor fluid line system.

BACKGROUND

The statements in this section merely provide background information related to the present disclosure and may not constitute prior art.

A variety of industrial processes, including by way of example, chemical processing, provide various fluids (e.g., liquids, gases, and/or plasma) through conduits or fluid lines to a processing area/component. After processing, these fluids, among other residual fluids, may further be exhausted from the processing area/component.

In a non-limiting example application, a fluid line system for a semiconductor processing system provides process gases to a processing chamber and removes exhaust gases outside from the processing chamber to an aftertreatment system, such as an abatement system. In some applications, a thermal system, in which heaters are disposed proximate and/or around conduits of the fluid line system, is provided to heat the gas flowing through the fluid line system. In addition to the heaters, the thermal system can include temperature sensors disposed at various locations of the fluid line system to monitor the temperature of the gas and control the heaters. Heating the gas of the fluid line system facilitates wafer processing operations in the processing chamber and the exhaust gas treatment in the gas abatement system.

SUMMARY

This section provides a general summary of the disclosure and is not a comprehensive disclosure of its full scope or all of its features.

The present disclosure provides a method of detecting a leak-induced abnormal condition in a fluid line system having a plurality of heaters. The method includes determining a plurality of temperature characteristics at a plurality of locations of the fluid line system, where each temperature from among the plurality of temperature characteristics is associated with at least one heater from among the plurality of heaters and monitoring, for each of the plurality of heaters, an electrical characteristic of the heater. The method includes determining the leak-induced abnormal condition is present within the fluid line system in response to the electrical characteristic of a given heater from among the plurality of heaters and the temperature characteristic associated with the given heater satisfying a temperature-and-electrical characteristics (TEC) deviation condition and performing a corrective action in response to determining the leak-induced abnormal condition is present.

In one form, the electrical characteristic includes voltage, current, power, or a combination thereof. In one form, the plurality of temperature characteristics are determined by a plurality of temperature sensors disposed at the plurality of locations. In one form, the method includes estimating a location of the leak-induced abnormal condition based on a location of the given heater, the location of the temperature characteristic associated with the given heater, or a combination thereof. In one form, performing the corrective action further comprises displaying a digital representation of the fluid line system with indicia illustrating the location of the leak-induced abnormal condition. In one form, where determining the leak-induced abnormal condition is present is further determined based on a correlation between supplemental data and at least one of the electrical characteristic of the given heater and the temperature associated with the given heater, where the supplemental data includes a pump pressure, a pump temperature, a fluid line pressure, a flow rate, a processing system schedule, or a combination thereof.

In one form, the method further includes estimating a location of the leak-induced abnormal condition based on a location of the given heater, the location of the temperature characteristic associated with the given heater, or a combination thereof. The method includes obtaining pump pressure data associated with a pump of the fluid line system and determining the leak-induced abnormal condition is not present in response to the pump pressure being greater than a threshold value and the location of the leak-induced abnormal condition corresponding to a location of the pump. In one form, determining the leak-induced abnormal condition is present is further based on the electrical characteristic of the given heater deviating from a nominal performance correlation, where the nominal performance correlation defines a correlation between the temperature characteristics and the electrical characteristics of the given heater during a nominal operation of the fluid line system. In one form, the electrical characteristics of the plurality of heaters are monitored concurrently with the temperature characteristics. In one form, determining whether the leak-induced abnormal condition is present is further based on a comparison between the temperature of the given heater and a nominal performance model, where the nominal performance model is indicative of temperature characteristics received during nominal operation of the fluid line system.

In one form, the method includes estimating a location of the leak-induced abnormal condition based on a location of the given heater, the location of the temperature characteristic associated with the given heater, or a combination thereof. In one form, the method includes obtaining one or more additional temperature characteristics from one or more temperature sensors of the fluid line system and determining the leak-induced abnormal condition is not present in response to the one or more additional temperature characteristics corresponding to the temperature associated with the temperature sensor. In one form, the TEC deviation condition is satisfied in response to a decrease of an applied power to the given heater, as the electrical characteristic, and an increase of a value of the temperature, as the temperature characteristic, associated with the given heater.

The present disclosure provides a system of detecting a leak-induced abnormal condition in a fluid line system having a plurality of heaters. The system includes one or more processors and one or more nontransitory computer-readable mediums comprising instructions that are executable by the one or more processors. The instructions include determining a plurality of temperature characteristics at a plurality of locations of the fluid line system, where each temperature from among the plurality of temperature characteristics is associated with at least one heater from among the plurality of heaters and monitoring, for each of the plurality of heaters, an electrical characteristic of the heater. The instructions include determining the leak-induced abnormal condition is present within the fluid line system in response to at least one of: the electrical characteristic of a given heater from among the plurality of heaters and the temperature characteristic associated with the given heater satisfying a temperature-and-electrical characteristics (TEC) deviation condition; and the electrical characteristic of the given heater deviating from a nominal performance correlation, wherein the nominal performance correlation defines a correlation between the temperature characteristics and the electrical characteristics of the given heater during a nominal operation of the fluid line system. The instructions include performing a corrective action in response to determining the leak-induced abnormal condition is present.

In one form, the instructions further comprise estimating a location of the leak-induced abnormal condition based on a location of the given heater, the location of the temperature characteristic associated with the given heater, or a combination thereof. In one form, the instructions for performing the corrective action further comprises displaying a digital representation of the fluid line system with indicia illustrating the location of the leak-induced abnormal condition. In one form, the instructions for determining the leak-induced abnormal condition is present is further based on a correlation between supplemental data and at least one of the electrical characteristic of the given heater and the temperature associated with the given heater, where the supplemental data includes a pump pressure, a pump temperature, a fluid line pressure, a flow rate, a processing system schedule, or a combination thereof. In one form, the plurality of temperature characteristics are determined by a virtual sensing mathematical model. In one form, the plurality of temperature characteristics are determined based on the electrical characteristics of the heaters.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a graph illustrating temperature and power measurements for selected temperature sensors and heater zones according to the present disclosure;

FIG. 4B is another graph illustrating temperature and power measurements for selected temperature sensors and heater zones according to the present disclosure;

FIG. 4C is another graph illustrating temperature and power measurements for selected temperature sensors and heater zones according to the present disclosure.

Figure 1:
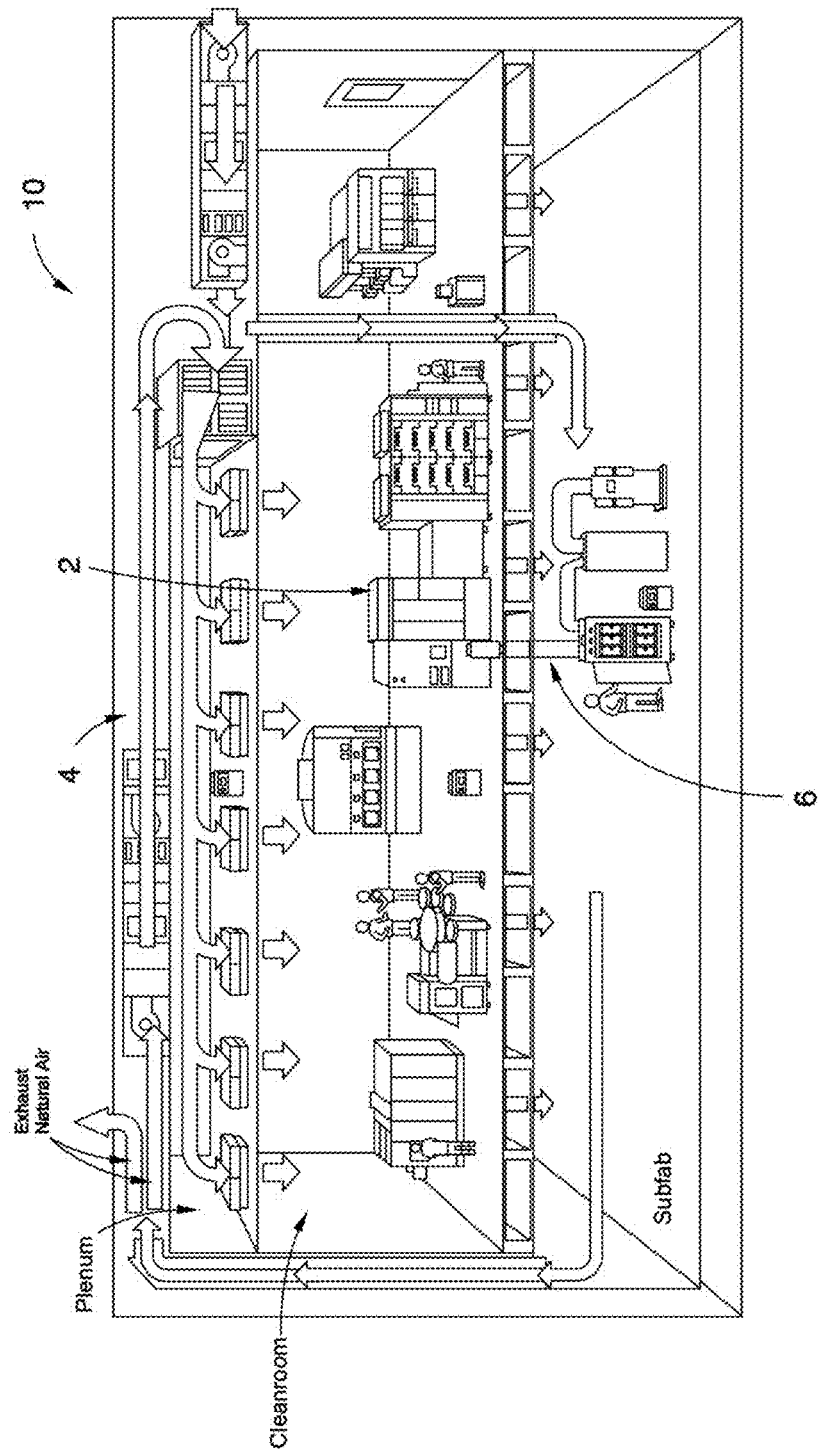
FIG. 1 illustrates a semiconductor processing system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Process gases used in industrial processes, such as by way of example, semiconductor wafer processing, may be toxic, pyrophoric, or corrosive (e.g., ammonia, silane, argon, arsine, and/or phosphine, among other gases). Unused process gases and hazardous by-products are delivered to an abatement system, where the unused process gases and by-products are cleansed and neutralized prior to being released to the environment.

A fluid line system generally includes conduits, bellows, flanges, seals, valves, and/or joint connectors, among other fluid line components/devices for transporting fluid. At times, portions of the fluid line system may undergo repair and/or maintenance that may require the lines to be disconnected and reconnected. In the event the lines are inadequately sealed, outside air/moisture may leak into the fluid line system, thereby causing spontaneous ignition within the lines and increasing the temperature of the gas within the fluid line system.

In one form, the present disclosure is directed toward a thermal system configured to detect a foreign heat source, other than heaters used for the nominal process, which heats the fluid line system. More particularly, the thermal system is configured to perform a system diagnostic in which the thermal system monitors temperature characteristics (e.g., temperature, resistances that are indicative of temperature, voltages that are indicative of temperature, currents that are indicative of temperature, among others) of the fluid line system concurrently with electrical characteristics of the heaters (e.g., power, voltage, resistance, and/or current) disposed along or proximate the fluid line system. As used herein, "concurrently" refers to at the same time or approximately the same time.

When power to a heater decreases while temperature measurements (as the temperature characteristic) associated with the heater increase beyond a threshold temperature value, the thermal system may determine a presence of a foreign heat source and, more particularly, an occurrence/presence of an exothermic reaction within the fluid line system potentially caused by a leak (i.e., a leak-induced abnormal condition). The thermal system then generates a notification of the exothermic reaction and provides an estimated location of the exothermic reaction based on a location of the heater and/or the temperature sensor.

In one form, the thermal system is communicably coupled to other subsystems and sensor devices to obtain supplemental data indicative of the performance and/or operation characteristics of the subsystem and the thermal system. For example, in a semiconductor processing system, the thermal system obtains: data indicative of a pump pressure, pump temperature, and/or fluid line pressure; a processing system schedule(s) (e.g., schedule of processes being performed in the chamber, maintenance/repair schedule, among others); statuses of various subsystems (e.g., no flow, system idle, redundant system); flow rate and/or pressure of gases in the fluid line system; metadata; and/or information regarding the type of process gases. The thermal system may employ the supplemental data to determine if the foreign heat source is related to operations of other subsystems, correlate the supplemental data with the temperature characteristics and electrical characteristics of the heaters to define relationships between the subsystems.

Specifically, the thermal system may correlate the supplemental data with the temperature characteristics and/or electrical characteristics of the heaters to illustrate the relationship between leak-induced abnormal conditions and at least one of pump pressure, pump temperature, fluid line pressure, processing system schedules, statuses of various subsystems, flow rate and/or pressure of gases in the fluid line system, metadata, and information regarding the type of process gases. As such, the thermal system may evaluate performance/operation characteristics of subsystems at the time of a potential leak-induced abnormal condition of the thermal system to verify the presence of the leak-induced abnormal condition and/or perform other suitable analytics.

While the thermal system of the present disclosure is described in association with a semiconductor processing system, the thermal system may be applied to other industries in which chemical gases, or any other fluid, are temperature-controlled and transported. As an example, the thermal system may be applied to fluid line systems in oil and gas industries (e.g., onshore and offshore oil production).

Referring to FIG. 1, a semiconductor processing system 10 generally includes a semiconductor chamber 2 and a fluid line system for transporting fluid to/from semiconductor chamber 2. More particularly, in one form, the fluid line system includes delivery lines 4 (i.e., supply lines) to provide process gases to the chamber and discharge lines 6 that remove exhaust gases, such as unused process gases and by-products, from the semiconductor chamber 2 to a gas abatement system. In an example application, the discharge lines 6 are formed by multiple lines, including a fore line to fluidly couple the chamber to a pump (not shown) and an exhaust line to fluidly couple the pump to an abatement system.

Figure 2:
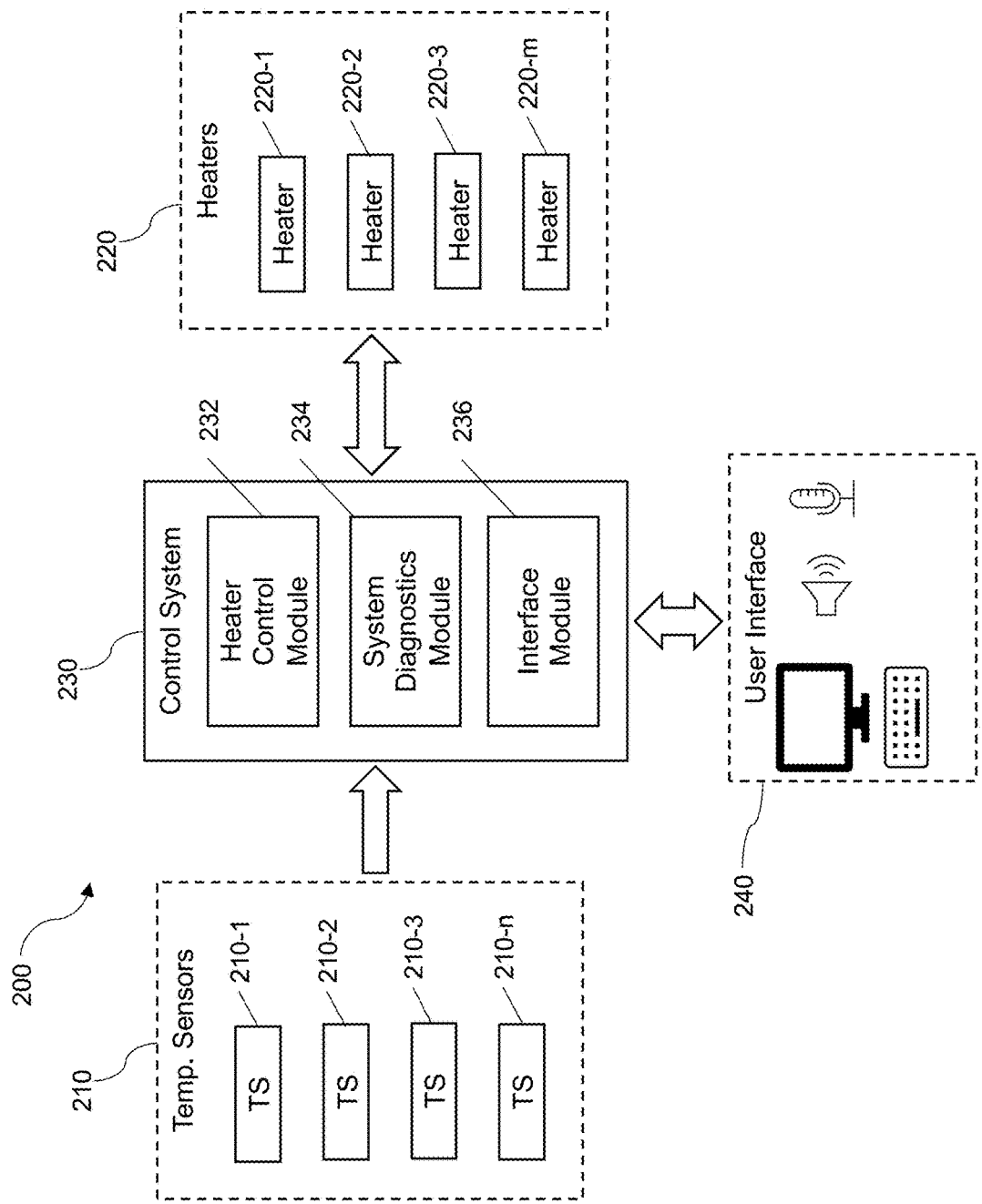
FIG. 2 is a block diagram of a thermal system for the semiconductor processing system constructed in accordance with the present disclosure.

In one form, referring to FIG. 2, a thermal system 200 of the present disclosure is provided for heating the discharge lines 6 of the fluid line system. The thermal system 200 includes a plurality of temperatures sensors 210-1, 210-2, 210-3 . . . 210-$n$ (collectively referred to hereinafter as "temperature sensors 210"), a plurality of heaters 220-1, 220-2, 220-3 . . . 220-$m$ (collectively referred to hereinafter as "heaters 220") disposed along the discharge lines 6 (not shown in FIG. 2), a control system 230 for controlling the heaters 220, and a user interface 240. While the thermal system 200 is described in association with the discharge lines 6, it should be readily understood that the thermal system 200 of the present disclosure may be provided for other lines of the fluid flow system (e.g., the delivery lines 4) and should not be limited to the discharge lines 6.

It should be readily understood that any one components of the control system 230 and the user interface 240 can be provided at the same location or distributed at different locations (e.g., via one or more edge computing devices) and communicably coupled accordingly. While the control system 230 and the user interface 240 are illustrated as part of the thermal system 200, it should be understood that the control system 230 and the user interface 240 may be positioned remotely from the thermal system 200. In one form, the various components of the thermal system 200 are communicably coupled using a wired communication protocol and/or a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the temperature sensors 210 are provided at a plurality of locations along the discharge lines 6 and are configured to determine a temperature characteristic of the discharge lines 6. Example temperature characteristics include, but are not limited to: a temperature of the discharge lines 6, resistances that are indicative of a temperature of the discharge lines 6, voltages that are indicative of a temperature of the discharge lines 6, currents that are indicative of a temperature of the discharge lines 6, among others. The temperatures sensors 210 may be provided by various temperature sensing devices, including, but not limited to: thermocouples, resistance temperature detectors, among other temperature sensing devices.

In one form, the control system 230 may perform virtual sensing routines to measure the temperature characteristics of the discharge lines 6, and thus, all or one or more of the temperature sensors 210 may be removed from the thermal system 200. As an example, the control system 230 may obtain one or more inputs from the heaters 220, including, but not limited to: mass flow rate, flow velocity, flow temperature either upstream or downstream of the heaters 220, heater power input, and parameters derived from the physical characteristics of the heaters 220. Example parameters derived from the physical characteristics of the heaters 220 include, but are not limited to: a resistance wire diameter, an insulation thickness, a sheath thickness, conductivity, specific heat and density of the materials, heat transfer coefficient, emissivity of the heater 220 and discharge lines 6, among other geometrical and application-related parameters. The control system 230 may measure the temperature characteristics of the discharge lines 6 based on a mathematical model and the one or more inputs. Example virtual sensing routines to measure the temperature characteristics of the discharge lines 6 using the one or more inputs and a mathematical model are disclosed in U.S. Pat. No. 10,544,722, which is commonly owned with the present application and the contents of which are incorporated herein by reference in its entirety.

In one form, the heaters 220 are flexible heaters wrapped around the discharge lines 6 (not shown) to heat the fluid flowing therein. In another example, the heaters 220 are cartridge heaters disposed along or proximate the fluid lines to heat the fluid flowing through the delivery line 4 and the discharge lines 6. In one form, the heaters 220 define a plurality of zones that are independently controlled to a selectable temperature setpoint. In an example application, a zone may include one or more heaters 220. Furthermore, the heaters 220 may be external or internal to the fluid line while remaining within the scope of the present disclosure.

In one form, the heaters 220 are two-wire heaters that are configured to generate heat and sense temperature. For example, the two-wire heaters (as the heaters 220) include one or more resistive heating elements made of a material having a relatively high temperature coefficient of resistance (TCR). The heating elements are operable as a heater to generate heat and as a sensor for measuring an average temperature of the heating element based on a change in resistance of the resistive heating element. More particularly, the two-wire heater is disclosed in U.S. Pat. No. 7,196,295, which is commonly owned with the present application and the contents of which are incorporated herein by reference in its entirety. In one form, the electrical characteristics of the heating element (e.g., current and/or voltage) are measured and used to determine the resistance and then the temperature of the heating element. Accordingly, with the two-wire heater (as the heater 220 and for providing temperature characteristics), all or one or more of the temperature sensors 210 may be removed from the thermal system 200.

In another variation, as a two-wire heater, the heater 220 is configured to include temperature sensing power pins for measuring a temperature of the heater 220. Using the power pins as a thermocouple to measure a temperature of a resistive heating element is disclosed in U.S. Pat. No. 10,728,956, which is commonly owned with the present application and the contents of which are incorporated herein by reference in its entirety. Generally, the resistive heating element of the heater 220 and the control system 230 are connected via a first power pin and a second power pin that define a first junction and a second junction, respectively. The first and second power pins function as thermocouple sensing pins for measuring temperature characteristics of the resistive heating element of the heater 220. The control system 230, which is in communication with the first and second power pins, may be configured to measure changes in voltage at the first and second junctions (as temperature characteristics). More specifically, the control system 230 may measure millivolt (mV) changes at the junctions and then uses these changes in voltage to calculate a temperature of the resistive heating element or use the voltage change, which are indicative of a temperature, to control the heater 220.

In one form, the control system 230 includes a heater control module 232, a system diagnostic module 234, and an interface module 236. In one form, the heater control module 232 is configured to independently control each zone defined by the heaters 220 and thus is configured to determine an operation setpoint for each of the zones and provide power (e.g., voltage) to the heater(s) 220 of each zone. The heater control module 232 may employ one or more control schemes, such as proportional-integral-derivative (PID) control, model-based control, among other control schemes configured to determine the operation setpoint for each of the zones based on, for example, feedback data from the temperature sensors 210. More particularly, each zone may be associated with one or more temperature sensors 210 disposed at the zone, and thus, the heater control module 232 employs measurements from at least the associated temperature sensors 210 to determine operation setpoints for the heater(s) 220 of the zone. The operation setpoint may include a temperature setpoint, a power setpoint, a ramp rate, among others. Once the operation setpoint is determined, the heater control module 232 determines the amount of power to be applied to the heaters 22 and provides the requisite output voltage. Accordingly, the heater control module 232 may include a power converter (e.g., a buck converter) for providing adjustable output power to the heaters 220.

In one form, if the heaters 220 are two-wire heaters (i.e., the heaters 220 are configured to generate heat and sense temperature as set forth above), the heater control module 232 is configured to monitor other electrical characteristics of the heaters 220 besides power being applied, such as voltage, current, and/or resistance of the resistive element of the heaters 220 to obtain temperature characteristics. Further, based on the type of two-wire heater, the heater control module 232 may determine an average temperature of the heater 220 based on the resistance of the heater 220 and a predefined algorithm/model that associates the resistance to a temperature or a temperature at the power junctions using predefined algorithm/models that associate voltage changes to a temperature. Alternatively, the resistance or change in voltage may be employed as the temperature characteristic.

In one form, the system diagnostics module 234 is configured to perform a diagnostic to detect a leak-induced abnormal performance of the thermal system 200, the discharge line 6, or a combination thereof. As described in detail below, the diagnostic includes detecting exothermic reaction(s) within the discharge lines, which further indicates potential leaks of the discharge lines 6.

As provided above, when external gases (e.g., oxygen, moisture) enter the discharge lines 6, the external gases can cause an exothermic reaction with the gases flowing in the lines. This reaction generates a significant amount of heat, thereby causing an increase in the temperature of the discharge line 6. In one form, the increase in temperature is detected by at least one or more temperature sensors 210 positioned in proximity to the exothermic reaction. In response to the increase of temperature, the heater control module 232 may decrease power to the heaters 220 associated with the temperature sensors 210 proximate to the reaction if the measured temperature is above a temperature setpoint.

The system diagnostic module 234 is configured to monitor electrical characteristics of the heaters 220 (i.e., power, voltage, resistance, current, among others) associated with the temperature characteristics to determine the presence of the leak-induced abnormal condition. As an example, the system diagnostic module 234 determines the presence of a leak-induced abnormal condition within the discharge lines 6 when the electrical characteristics of the heaters 220 and the temperature measured by the temperature sensors satisfy a temperature-and-electrical characteristics (TEC) deviation condition. As used herein, "TEC deviation condition" refers to a condition of the fluid flow system in which a temperature characteristic trend as a function of time and an electrical characteristic trend as a function of time diverge and/or deviate from expected trends. As an example and as described below in further detail, the TEC deviation condition is satisfied when applied power to the heater 220 decreases and the concurrently measured temperature from one of the temperature sensors 210 associated with the heater 220 increases and/or deviates from an expected measured temperature by a threshold value.

It should be readily understood that the TEC deviation condition may also be determined using temperature characteristics from, for example, two-wire heaters or virtual sensing routines (e.g., resistances that are indicative of a temperature, voltages that are indicative of a temperature, and/or currents that are indicative of a temperature) described herein and should not be limited to temperature measurements from temperature sensors. That is, the TEC deviation condition may be satisfied when applied power to the heater 220 decreases and the concurrently measured voltage, resistance, and/or current indicative of the temperature and associated with the heater 220 deviates from an expected measured value by a corresponding threshold.

In one form, the system diagnostic module 234 determines the presence of a leak-induced abnormal condition when the TEC deviation condition is satisfied and the electrical characteristic of the heater 220 deviates from a nominal performance correlation. In one form, the nominal performance correlation defines a correlation between the temperature characteristics and electrical characteristics of the heaters 220 during nominal/standard operations of the thermal system 200 and/or the fluid line system, such as when there is no gas leak, the conduits of the fluid line system are substantially free of build-up, among other standard operating conditions.

Figure 3:
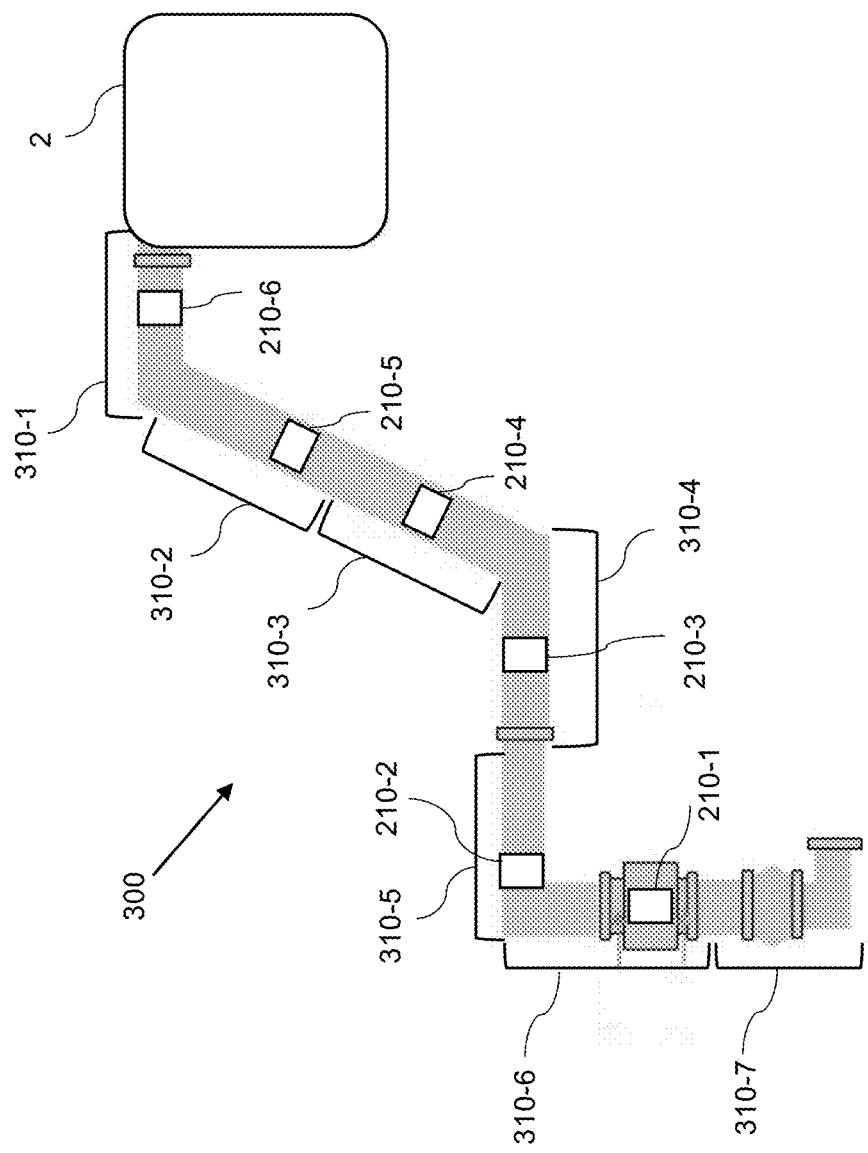
FIG. 3 illustrates an example exhaust line having multiple heater zones and multiple temperature sensors in accordance with the present disclosure.

Referring to FIGS. 3, 4A, 4B, and 4C, an example application of the diagnostic is provided. FIG. 3 illustrates an example exhaust line 300 of a discharge line 6 through which exhaust gas from the semiconductor chamber 2 is provided to an abatement system. In this example, the exhaust line 300 includes seven heater zones 310-1, 310-2, 310-3, 310-4, 310-5, 310-6, 310-7 (collectively referred to hereinafter as "zones 310"), where each zone 310 has one or more heaters 220 wrapped about the exhaust line 300 to heat the fluid therein (not shown). The exhaust line 300 further includes six temperatures sensors 210-1, 210-2, 210-3, 210-4, 210-5, 210-6 (e.g., six thermocouples) distributed throughout the exhaust line 300 to measure temperature. In one form, each temperature sensor 210 is associated with a heater zone 310 in proximity to the temperature sensor 210 (e.g., the temperature sensor 210-6 is associated with the heater zone 310-1, the temperature sensor 210-5 associated with the heater zone 310-2, the temperature sensor 210-4 is associated with the heater zone 310-3, the temperature sensor 210-3 is associated with the heater zone 310-4, the temperature sensor 210-2 is associated with the heater zone 310-5, and the temperature sensor 210-1 is associated with the heater zone 310-6).

In another example, all or one or more of the temperature sensors 210 may be removed from the thermal system 200, and as such, the system diagnostic module 234 may perform the virtual sensing routines described herein to determine the temperature characteristics of the discharge lines 6 at each of the heater zones 310. In another variation, using one or more of the two-wire heaters (as the heaters 220) described above, all or one or more of the temperature sensors 210 may be removed, and the heater control module 232 determines the temperature characteristics associated with the respective heater 220.

In the example of FIG. 3, the system diagnostic module 234 is configured to monitor temperature from the temperature sensors 210 concurrently with the electrical characteristics of the heaters 220, which can be provided by the heater control module 232. Specifically, referring to FIGS. 4A-4C, temperature and power are tracked over time to detect leak-induced abnormal heating of the exhaust lines 300. FIG. 4A illustrates data for the temperature sensor 210-2 and the associated heater zone (i.e., the heater zone 310-5), FIG. 4B illustrates data for the temperature sensor 210-3 and the associated heater zone (i.e., the heater zone 310-4), and FIG. 4C illustrates data for the temperature sensor 210-4 and the associated heater zone (i.e., the heater zone 310-3).

As shown, the temperature sensor 210-2 and the temperature sensor 210-4 detect stable temperatures that are associated with the power being provided to the heater zone 310-5 and the heater zone 310-3, respectively. However, measurements from the temperature sensor 210-3 indicate a rise in temperature while the power to the heater zone 310-4 is decreasing (i.e., the TEC deviation condition is satisfied), which indicates that the exhaust line 300 is being heated by a foreign heat source, such as an exothermic reaction, and not the heaters 220. Based on the position of the temperature sensor 210-3, the system diagnostic module 234 estimates a proximate location of the leak-induced abnormal condition as the heater zone 310-4. With this information, a follow-up check can be conducted by technicians to check for leaks that can cause the exothermic reaction. For example, the technicians may check if a leak is present at, for example, a connection joint at the heater zone 310-4.

In addition to evaluating temperature characteristics and electrical characteristics of the heaters 220 to determine whether the TEC deviation condition is satisfied, the system diagnostic module 234 may use supplemental data from other subsystems and/or sensors to detect the leak-induced abnormal condition. Specifically, in one form, the control system 230 is communicably coupled to other (sub)systems and/or sensor devices to receive supplemental data (e.g., metadata) that includes contextual information (e.g., date, time, chamber identification, among others), performance/operation characteristics of subsystems, other performance characteristics of the gases provided in the fluid line system, among other information. In one form, the control system 230 receives supplemental data from subsystems (e.g., a pump subsystem, a process chamber system, among others) that may influence the performance/operation of the thermal system 200. Examples of different types of supplemental data are provided above. In one form, the supplemental data can be employed to confirm the exothermic reaction. For example, if the pump pressure is high (i.e., the pump pressure is greater than a threshold value) and the suspected exothermic reaction is near the pump, the system diagnostic module 234 may determine that the foreign heat source is the pump and not an exothermic reaction.

In some forms, patterns in the data collected during normal operations and/or regular maintenance events (e.g., pump swaps, chamber idle, bypass roll) that may indicate an exothermic reaction can be employed by the system diagnostic module 234 to rule out possible false alarms. In addition, information regarding maintenance and/or repairs performed on the fluid line system may be captured by the system diagnostic module 234 (e.g., a technician manually enters information via the user interface and/or the control system maintenance/repair schedule) to further identify the location of the leak.

In one form, while the system diagnostic module 234 is described as detecting exothermic reactions related to possible fluid line leakage, the system diagnostic module 234 may also detect endothermic reactions/states within the fluid line system based on the industrial application. More particularly, in one form, an increase of power to one or more heaters 220 and a decrease of temperature near the one or more heaters 220 may indicate a loss of thermal energy unrelated to nominal operations of the industrial application (i.e., a foreign heat sink).

While the system diagnostic module 234 is configured to detect the leak-induced abnormal condition based on the electrical characteristics of the heaters 220 and temperature characteristics, in one form, the system diagnostic module 234 is configured to detect the leak-induced abnormal condition (e.g., a foreign heat source and/or foreign heat sink) based on temperature characteristics associated with the temperature sensors 210. For example, knowing the location of the temperature sensors 210, the temperature characteristics from the temperature sensors 210 are monitored in relation to one or more nominal performance models/algorithms that are representative of temperature characteristics received during nominal operations of the industrial application, such as a semiconductor fluid line system. If an increase in temperature (as the temperature characteristic) is detected, the system diagnostic module 234 may determine a leak-induced abnormal condition at or in proximity to the temperature sensor 210 associated with the temperature characteristic (i.e., an identified temperature sensor). It should be understood that the temperature characteristics may be obtained from the virtual sensing routines and/or the two-wire heaters (as the heaters 220) in lieu or in addition to the temperature sensors 210 in this example.

In one form, the system diagnostic module 234 may also compare the increased temperature measurement (as the temperature characteristic) from the identified temperature sensor 210 with temperature measurements from other temperature sensors 210. If the other temperature sensors 210, such as those directly upstream and/or downstream of the identified sensors, detect substantially the same increase, the system diagnostic module 234 may determine that the fluid line system is normal and the leak-induced abnormal condition is absent. Alternatively, if the temperature measurements indicate varying thermal energy consistent with that of a foreign heat source (e.g., a cooler temperature upstream of the identified sensor and an increased temperature downstream of the identified sensor), then the system diagnostic module 234 determines the presence of a foreign heat source that is likely caused by a leak in the fluid line system (i.e., the leak-induced abnormal condition is satisfied). In one variation, the location of the foreign heat source can be estimated based on the location of the identified temperature sensor 210 and/or the other temperature sensors 210. It should be understood that the temperature characteristics may be obtained from the virtual sensing routines and/or the two-wire heaters (as the heaters 220) in lieu or in addition to the temperature sensors 210 in this example.

In one form, the interface module 236 is communicably coupled to the user interface 240 to exchange information with a user. As an example, the interface module 236 may display temperature characteristics from the temperature sensors, a virtual representation of the discharge line 6, alerts/notifications, among other information. In addition, the interface module 236 may receive input from the user by way of the user interface 240 (e.g., a keyboard, a mouse, a touchscreen, a display monitor, an augmented reality device, and/or a plurality of light-emitting diodes (LEDs)), auditory interfaces, and/or haptic interfaces).

In one form, the interface module 236 is configured to perform a corrective action in response to the system diagnostics module 234 detecting the leak-induced abnormal condition. Example corrective actions include, but are not limited to: generating a notification based on the leak-induced abnormal condition, turning off power to the heaters 220, recalibrating gain parameters of one or more control routines performed by the heater control module 232 to inhibit damage to the heaters 220, or a combination thereof.

As a specific example, the system diagnostic module 234 may provide a digital representation of the discharge lines 6, the heaters 220 positioned on the discharge line 6, and, if applicable, the temperature sensors 210 disposed along the discharge lines 6. The system diagnostic module 234 may identify an approximate location of the leak-induced abnormal condition of the digital representation with various indicia or other distinguishing graphics/text (e.g., graphical user interface elements that uniquely identify the location associated with leak-induced abnormal condition) and the interface module 236 may generate a notification causing the user interface 240 to display the digital representation with an alert of the temperature characteristics, electrical characteristics, and/or supplemental data. While specific examples are provided, other notifications may be provided via the user interface 240, such as auditory alerts, haptic alerts, among others.

Figure 5:
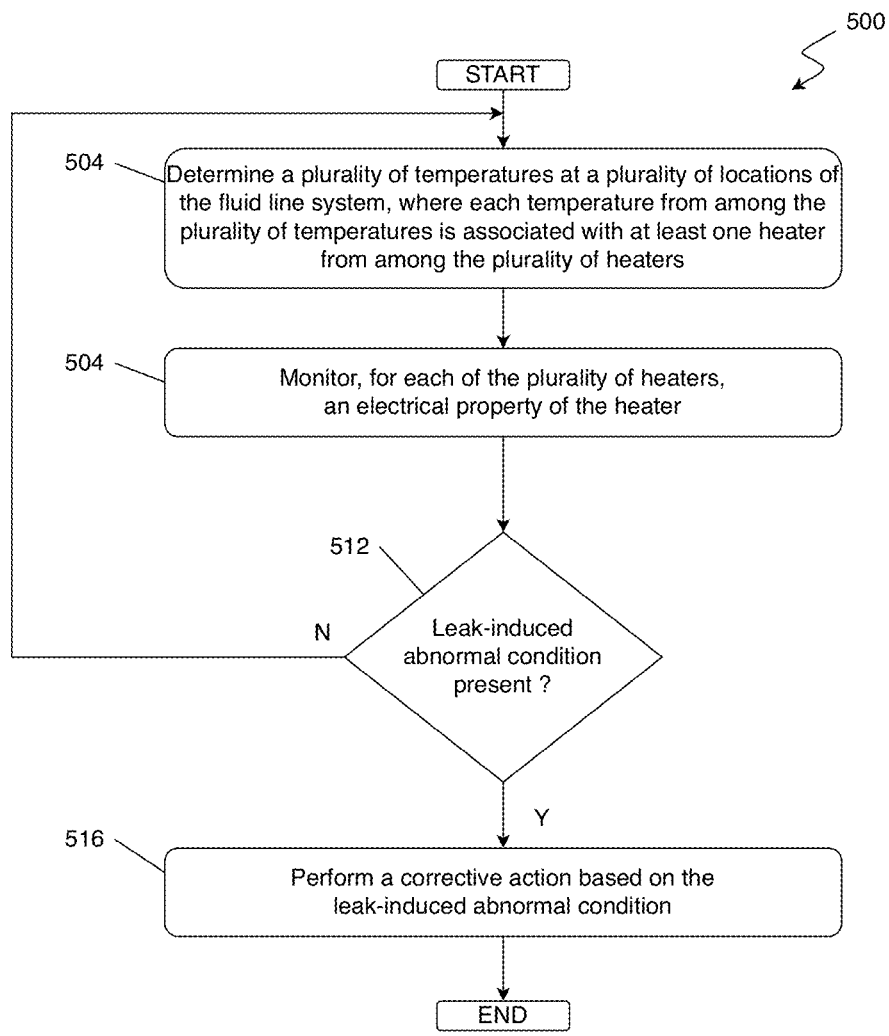
FIG. 5 is a flowchart of an example routine performed by a control system in accordance with the teachings of the present disclosure.

Referring to FIG. 5, a flowchart illustrating an example routine 500 for detecting a leak-induced abnormal condition of the fluid line system is shown. At 504, the control system 230 determines a plurality of temperature characteristics at a plurality of locations of the fluid line system (e.g., the heater zones 310), where each temperature characteristic is associated with at least one of the heaters 220. At 508, the control system 230 monitors an electrical characteristic of each of the heaters 220.

At 512, the control system 230 determines whether the leak-induced abnormal condition is present. As an example, the control system 230 determines the leak-induced abnormal condition is present in response to at least one of: the electrical characteristic of a given heater from among the plurality of heaters and the temperature characteristic associated with the given heater satisfying a temperature-and-electrical characteristics (TEC) deviation condition (e.g., when power to the heater 220 decreases while temperature characteristics associated with the heater 220 increase); and the electrical characteristic of the given heater deviating from a nominal performance correlation, wherein the nominal performance correlation defines a correlation between the temperature characteristics and the electrical characteristics of the given heater during a nominal operation of the fluid line system. If the leak-induced abnormal condition is present at 512, the routine 500 proceeds to 516, where the control system 230 and/or the user interface 240 perform a corrective action based on the leak-induced abnormal condition. If the leak-induced abnormal condition is not present at 512, the routine 500 proceeds to 504.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of detecting a leak-induced abnormal condition in a fluid line system having a plurality of heaters, the method comprising:
   determining a plurality of temperature characteristics at a plurality of locations of the fluid line system, wherein each temperature characteristic from among the plurality of temperature characteristics is associated with at least one heater from among the plurality of heaters;
   monitoring, for each of the plurality of heaters, an electrical characteristic of the heater;
   determining the leak-induced abnormal condition is present within the fluid line system in response to the electrical characteristic of a given heater from among the plurality of heaters and the temperature characteristic associated with the given heater satisfying a temperature-and-electrical characteristics (TEC) deviation condition; and
   performing a corrective action in response to determining the leak-induced abnormal condition is present.

2. The method of claim 1, wherein the electrical characteristic includes voltage, current, power, or a combination thereof.

3. The method of claim 1, wherein the plurality of temperature characteristics are determined by a plurality of temperature sensors disposed at the plurality of locations.

4. The method of claim 3 further comprising estimating a location of the leak-induced abnormal condition based on a location of the given heater, a location of a temperature sensor from among the plurality of temperature characteristics and associated with the given heater, or a combination thereof.

5. The method of claim 1, wherein performing the corrective action further comprises displaying a digital representation of the fluid line system with indicia illustrating a location of the leak-induced abnormal condition.

6. The method of claim 1, wherein determining the leak-induced abnormal condition is present is further determined based on a correlation between supplemental data and at least one of the electrical characteristic of the given heater and the temperature characteristic associated with the given heater, wherein the supplemental data includes a pump pressure, a pump temperature, a fluid line pressure, a flow rate, a processing system schedule, or a combination thereof.

7. The method of claim 1 further comprising:
   estimating a location of the leak-induced abnormal condition based on a location of the given heater, the location of the temperature characteristic associated with the given heater, or a combination thereof;
   obtaining pump pressure data associated with a pump of the fluid line system; and
   determining the leak-induced abnormal condition is not present in response to the pump pressure being greater than a threshold value and the location of the leak-induced abnormal condition corresponding to a location of the pump.

8. The method of claim 1, wherein determining the leak-induced abnormal condition is present is further based on the electrical characteristic of the given heater deviating from a nominal performance correlation, wherein the nominal performance correlation defines a correlation between the temperature characteristics and the electrical characteristics of the given heater during a nominal operation of the fluid line system.

9. The method of claim 1, wherein the electrical characteristics of the plurality of heaters are monitored concurrently with the temperature characteristics.

10. The method of claim 1, wherein determining whether the leak-induced abnormal condition is present is further based on a comparison between the temperature of the given heater and a nominal performance model, wherein the nominal performance model is indicative of temperature characteristics received during nominal operation of the fluid line system.

11. The method of claim 1, wherein the plurality of temperature characteristics are determined by a virtual sensing mathematical model.

12. The method of claim 1, wherein the plurality of temperature characteristics are determined based on the electrical characteristics of the heaters.

13. The method of claim 1 further comprising:
   estimating a location of the leak-induced abnormal condition based on a location of the given heater, the location of the temperature characteristic associated with the given heater, or a combination thereof;
   obtaining one or more additional temperature characteristics from one or more temperature sensors of the fluid line system; and
   determining the leak-induced abnormal condition is not present in response to the one or more additional temperature characteristics corresponding to the temperature associated with the temperature sensor.

14. The method of claim 1, wherein the TEC deviation condition is satisfied in response to a decrease of an applied power to the given heater, as the electrical characteristic, and an increase of a value of the temperature, as the temperature characteristic, associated with the given heater.

15. A system of detecting a leak-induced abnormal condition in a fluid line system having a plurality of heaters, the system comprising:
   one or more processors; and
   one or more nontransitory computer-readable mediums comprising instructions that are executable by the one or more processors, wherein the instructions comprise:
      determining a plurality of temperature characteristics at a plurality of locations of the fluid line system, wherein each temperature from among the plurality of temperature characteristics is associated with at least one heater from among the plurality of heaters;
      monitoring, for each of the plurality of heaters, an electrical characteristic of the heater;
      determining the leak-induced abnormal condition is present within the fluid line system in response to at least one of:

the electrical characteristic of a given heater from among the plurality of heaters and the temperature characteristic associated with the given heater satisfying a temperature-and-electrical characteristics (TEC) deviation condition; and the electrical characteristic of the given heater deviating from a nominal performance correlation, wherein the nominal performance correlation defines a correlation between the temperature characteristics and the electrical characteristics of the given heater during a nominal operation of the fluid line system; and performing a corrective action in response to determining the leak-induced abnormal condition is present.

16. The system of claim 15, wherein the plurality of temperature characteristics are determined by a plurality of temperature sensors disposed at the plurality of locations.

17. The system of claim 16, wherein the instructions further comprise estimating a location of the leak-induced abnormal condition based on a location of the given heater, the location of the temperature characteristic associated with the given heater, or a combination thereof.

18. The system of claim 17, wherein the instructions for performing the corrective action further comprises displaying a digital representation of the fluid line system with indicia illustrating the location of the leak-induced abnormal condition.

19. The system of claim 15, wherein the instructions for determining the leak-induced abnormal condition is present is further based on a correlation between supplemental data and at least one of the electrical characteristic of the given heater and the temperature associated with the given heater, wherein the supplemental data includes a pump pressure, a pump temperature, a fluid line pressure, a flow rate, a processing system schedule, or a combination thereof.

20. The system of claim 15, wherein the TEC deviation condition is satisfied in response to a decrease of an applied power to the given heater, as the electrical characteristic, and an increase of a value of the temperature, as the temperature characteristic, associated with the given heater.

21. The system of claim 15, wherein the electrical characteristics of the plurality of heaters are monitored concurrently with the temperature characteristics.

22. The system of claim 15, wherein the electrical characteristic includes voltage, current, power, or a combination thereof.

23. The system of claim 15, wherein the plurality of temperature characteristics are determined by a virtual sensing mathematical model.

24. The system of claim 15, wherein the plurality of temperature characteristics are determined based on the electrical characteristics of the heaters.

* * * * *